No. 756,669. PATENTED APR. 5, 1904.
C. H. MALONE.
CEMENT PLASTER KETTLE.
APPLICATION FILED SEPT. 17, 1903.
NO MODEL.

WITNESSES:
Phil E. Barnes.
Perry B. Turpin.

INVENTOR
Charles H. Malone.
BY Munn & Co.
ATTORNEYS

No. 756,669. Patented April 5, 1904.

UNITED STATES PATENT OFFICE.

CHARLES HENRY MALONE, OF ACME, TEXAS.

CEMENT-PLASTER KETTLE.

SPECIFICATION forming part of Letters Patent No. 756,669, dated April 5, 1904.

Application filed September 17, 1903. Serial No. 173,612. (No model.)

*To all whom it may concern:*

Be it known that I, CHARLES HENRY MALONE, a citizen of the United States, and a resident of Acme, in the county of Hardeman and State of Texas, have made certain new and useful Improvements in Cement-Plaster Kettles, of which the following is a specification.

My invention is an improvement in kettles for cooking gypsum in order to convert the same into cement-plaster; and the invention consists in certain novel constructions and combinations of parts, as will be hereinafter described and claimed.

Figure 1:
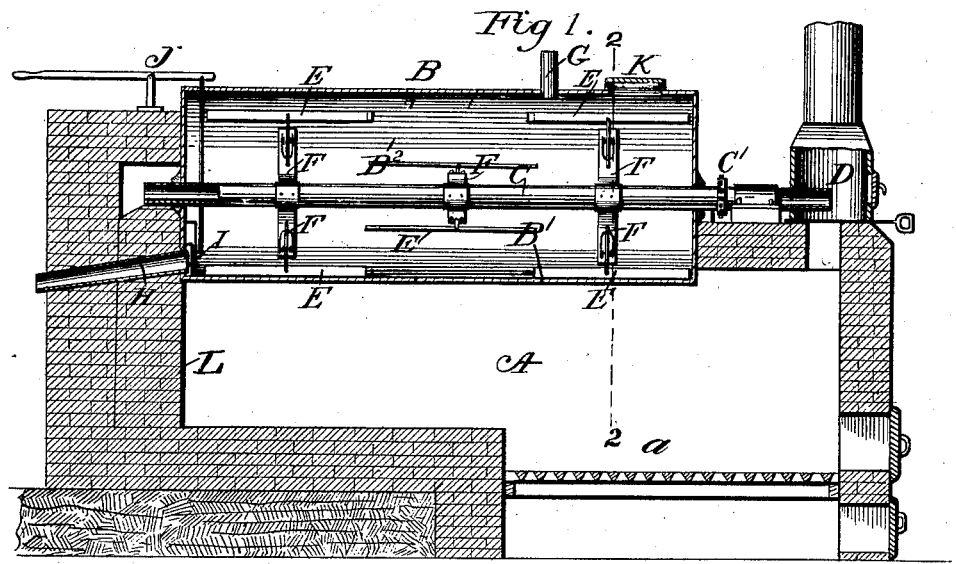
Figures 2, 3, 4:
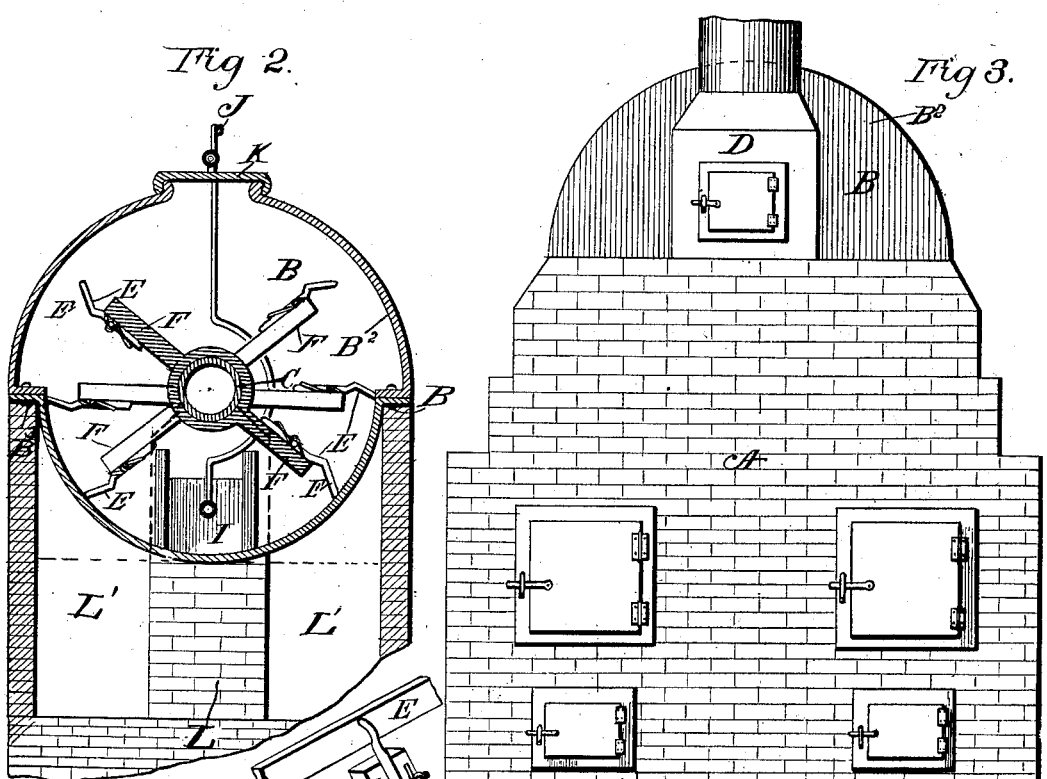

In the drawings, Figure 1 is a vertical longitudinal section of a kettle embodying my invention. Fig. 2 is a cross-section thereof on about line 2 2 of Fig. 1. Fig. 3 is a front elevation of the kettle, and Fig. 4 is a detail view showing the yielding connection between the scrapers and their supporting-arms.

In carrying out my invention I employ a furnace A, which may be of suitable brick or other material, having the fire-box $a$, above which extends the kettle proper, B. This kettle B has generally the form of a cylinder, the lower half B' being of less diameter than the upper half $B^2$ and the walls $B^3$ at the juncture of the upper and lower halves forming shoulders to rest upon the walls of the furnace in order to provide for firmly supporting the kettle proper upon the furnace-walls. The heat and products of combustion pass rearwardly beneath the kettle proper and thence discharge into the rear end of the hollow shaft C, through which they are conducted forwardly and discharge into the stack D. I thus utilize as far as possible all the heat units by means of the shaft, which shaft also carries the beaters or scrapers, which operate within the kettle proper and tend to agitate the raw material, as well as to scrape the bottom and prevent the kettle from burning. These scrapers E are carried on arms F, secured to the shaft C, and the scraper-plates E are preferably yieldingly connected with the arms F, as shown in Fig. 4, so the scrapers may give in order to pass any obstruction they may encounter in the operation of the machine. The shaft C has a sprocket or other gear C' by which it may be geared with any suitable drive power. A pipe G leads upwardly from the kettle for carrying off steam and dust that may accumulate in cooking the raw material.

A discharge-spout H leads from the rear end of the kettle and may be controlled by a gate or valve I, arranged for operation by the lever J, as will be understood from Fig. 1 of the drawings.

The scrapers E are so placed on the shaft that the entire bottom of the kettle will be scraped. If in operation the scraper should meet with an obstruction which could not be passed on the bottom or smaller half of the kettle, such obstruction will be released when it reaches the top or larger half of the kettle in the operation of the invention. It will be noticed that the lower half of the kettle proper fits well down in the fire-box, affording ample heating-surface extending throughout the length of the kettle, thus enabling me to secure the benefit of the heat and to cook the plaster with less fuel than in the ordinary kettles now employed.

A door K controls the supply-opening, through which gypsum may be fed to the kettle.

At its rear end the shaft C is supported on a pillow L, which also incloses the outlet-pipe H, preventing same from burning, two side flues or passages being provided at L', one on each side of the pillow or upright wall L, as will be understood from Figs. 1 and 2.

The scrapers are arranged on the hollow shaft in spiral form.

Having thus described my invention, what I claim as new, and desire to secure by Letters Patent, is—

1. An apparatus for cooking gypsum for converting the same into cement-plaster, comprising the furnace having a fire-box, the kettle proper having a lower half projecting within the fire-box and an upper half of greater diameter than the lower half, and resting upon the walls of the furnace, the hollow shaft extending through the kettle proper and receiving the products of combustion at one end, the stack to which said hollow shaft discharges at its other end, the yielding scrapers supported on the hollow shaft, the discharge-spout, and means for controlling the same, substantially as set forth.

2. The combination in an apparatus substantially as described, of the furnace, the kettle proper, having a lower half provided at its upper end with the outwardly-projecting flanges resting upon the furnace-wall and the upper section made larger than the lower section and provided at its lower edges with the inwardly-turned flanges resting upon and secured to the outwardly-turned flanges of the lower section, and the shaft operating within the kettle, substantially as set forth.

3. The combination in an apparatus substantially as described, of the shaft, the arms thereon, the scrapers provided with arms pivoted between their ends to the arms of the shaft, and the springs operating upon the inner ends of the scraper-arms, substantially as set forth.

CHARLES HENRY MALONE.

Witnesses:
    CHAS. VESTAL,
    CLAUDE VESTAL.